United States Patent [19]

Cohen

[11] 4,305,547

[45] Dec. 15, 1981

[54] WATER HEATER TEMPERATURE CONTROL SYSTEM

[75] Inventor: Kenneth W. Cohen, Harrington Park, N.J.

[73] Assignee: Aerco International, Inc., Northvale, N.J.

[21] Appl. No.: 967,595

[22] Filed: Dec. 8, 1978

[51] Int. Cl.³ .................. A47J 27/00; B60H 1/00; F28F 27/00

[52] U.S. Cl. .................................... 236/18; 126/374; 165/39

[58] Field of Search ............... 236/18, 19, 78 B, 12 A; 126/374; 165/39; 62/209

[56] References Cited

U.S. PATENT DOCUMENTS 1,485,897  3/1924  West et al. ........................ 236/19
3,721,386  3/1973  Brick et al. ..................... 236/12 A

OTHER PUBLICATIONS

Helitherm Heat Exchangers, Series B, Aerco International 1/1977, pp. 1-4.
Aerco International Inc., Schematic Control System.
Patterson-Kelly Co. Inc., 1968.
Robertshaw Instantrol Temperature Regulator Assembly RT-771 & HA-364.

Primary Examiner—William E. Wayner
Attorney, Agent, or Firm—Brumbaugh, Graves, Donohue & Raymond

[57] ABSTRACT

A water heater supplies hot water at a variable flow rate, depending on demand, and at a substantially constant, controlled temperature. It comprises a heat exchanger formed with an inlet and an outlet whereby water can be supplied to and withdrawn from the heat exchanger in accordance with demand and means for passing a second fluid such as steam through the heat exchanger coil to heat the water. A temperature gradient is thus established in the water in the direction of its flow through the heat exchanger. A sense tube forms a substantially homogeneous mixture of different portions of the water, these portions being drawn from sampling points spaced apart along the temperature gradient and in relative proportions depending on the flow rate of the water through the heat exchanger. The temperature of the water in the sense tube is detected, and control means responds to the sensed temperature for controlling the rate at which steam is supplied to heat the water. Thus a combined set point and feed forward control is established that minimizes fluctuations in the temperature of the hot water as withdrawn for end uses by anticipating changes in BTU requirements.

7 Claims, 6 Drawing Figures

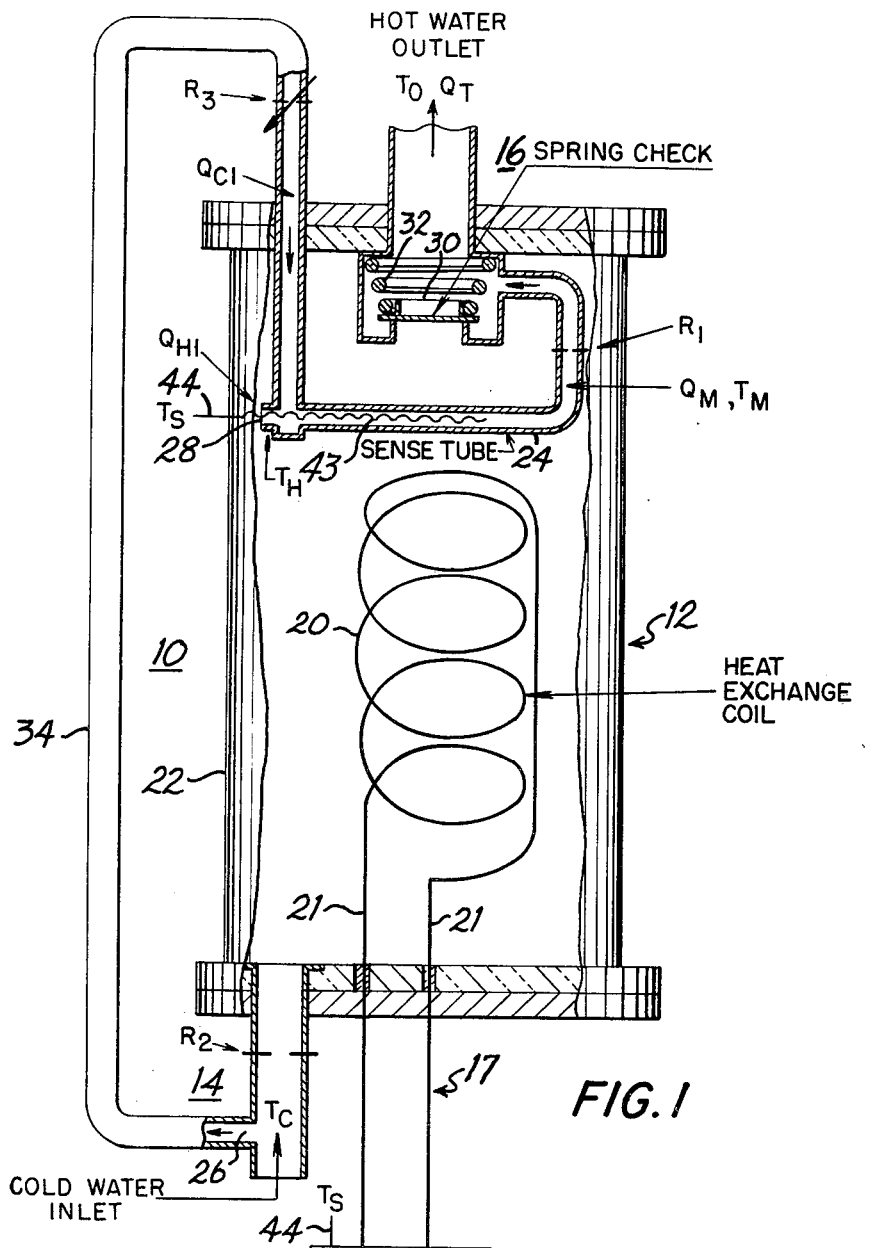
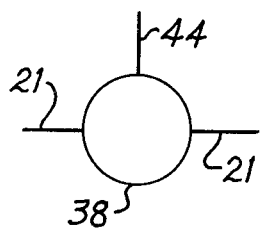
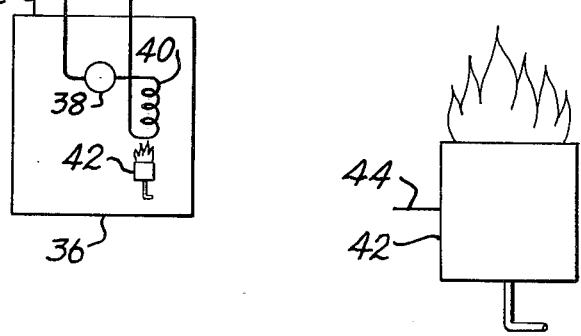
FIG.1
FIG.2
FIG.3

WATER HEATER TEMPERATURE CONTROL SYSTEM

BACKGROUND OF THE INVENTION

This invention relates to temperature control systems and, more particularly, to a novel and highly-effective water heater system wherein a combined set point and feed forward control is established that minimizes fluctuations in the temperature of the hot water by anticipating changes in BTU requirements.

Many hot water temperature control systems are known in the prior art. Often a thermostat is employed to establish a temperature set point and to control the heating of the water in such a manner as to maintain the temperature of the water as delivered by the system at this set point. Such a conventional thermostat system does not operate entirely satisfactorily in a water heater, however, in view of the layering of hot water over cold water in the storage tank. As hot water is withdrawn from the tank at the top and replaced by cold water at the bottom, the temperature sensor initially detects the desired high temperature and then suddenly, as the cold water reaches the level of the sensor, detects a temperature that may be 100° F. or more below the set point. The thermostat then calls for more heat to be supplied to the water, but by that time much of the storage tank is filled with cold water.

This problem is not solved by placing the temperature sensor at the bottom of the storage tank, near the incoming water; such placement does not permit precise control of the temperature of the water at the top of the tank, as delivered to the appliances or other end users of the hot water. Moreover, regardless of the location of the sensor in prior art systems of this type, there is an abrupt change in the temperature of the water at the sensor, often of 100° F. or more, as water is withdrawn from the storage tank. Since the system has no way of anticipating this abrupt change, it fails to call for heat as early as it should, and, when a call for heat is made, the system must run at maximum capacity for an extended period in order to catch up with demand.

The problem can be mitigated by providing a pump and associated plumbing for the purpose of mixing the heated and unheated water and deriving a signal based on the temperature of the mixture for controlling the BTU input to the storage tank. However, this proposal, put into practice in some commercial water heaters, has the serious drawbacks that it is costly and not entirely reliable. Specifically, the pump adds a significant increment to the price of the heating system and is subject to breakdown, leaving the system without a feedforward control.

SUMMARY OF THE INVENTION

An object of the invention is to remedy the problems of the prior art pointed out above. In particular, an object of the invention is to provide, in a system for heating or cooling water or another fluid, a combined set point and feed forward control that minimizes fluctuations in the temperature of the temperature-controlled fluid by anticipating changes in heat-transfer requirements. Another object of the invention is to provide such a control system that is less expensive and more reliable than conventional systems intended to accomplish the same result.

The foregoing and other objects are attained in accordance with the invention by the provision of a system comprising a novel combination of features for supplying a fluid at a variable flow rate, depending on demand, and at a substantially constant, controlled temperature. More particularly, the system comprises a heat exchanger formed with an inlet and an outlet whereby a fluid can be supplied to and withdrawn from the heat exchanger in accordance with demand. A second fluid is passed through the heat exchanger, the second fluid being physically isolated from, but in heat-exchange relation to, the first fluid. The fluids are respectively at temperatures such that heat is transferred between them and a temperature gradient is established in the first fluid in the direction of its flow.

Means is provided for forming a substantially homogeneous mixture of different portions of the first fluid. These portions are drawn from sampling points spaced apart along the temperature gradient described above and are in relative proportions depending on the flow rate of the first fluid through the heat exchanger.

Means is provided for sensing the temperature of the mixture, and a control responsive to the sensed temperature controls the rate of heat transfer between the first and second fluids. This control can be effected by controlling the temperature of the second fluid as supplied to the heat exchanger and/or by controlling the rate at which the second fluid is supplied to the heat exchanger.

In this manner, a combined set point and feed forward control is established that minimizes fluctuations in the temperature of the first fluid as withdrawn from the heat exchanger by anticipating changes in heat-transfer requirements.

In its preferred embodiments, the invention further comprises additional features that contribute to its efficient operation. Thus the outlet preferably comprises a main valve which is automatically adjustable in accordance with demand and a fixed, restricted orifice, the main valve and restricted orifice being hydraulically in parallel relation to each other. The means for forming a substantially homogeneous mixture of different portions of the first fluid then comprises a sense tube hydraulically connected on the one hand to the spaced-apart sampling points and on the other hand to the restricted orifice in such a manner that the portions of the first fluid collected at the sampling points flow serially through the sense tube as a substantially homogeneous mixture and through the restricted orifice.

Shunting means preferably extends between the sampling points, whereby the flow of the first fluid is divided into a main flow path accommodating most of the flow and a shunt flow path accommodating some of the flow. The system then further comprises second and third restricted orifices respectively (a) in the main flow path and hydraulically between the sampling points and (b) hydraulically in series with the sense tube and one of the sampling points. By this means, a pressure difference is established between the sampling points depending on the flow rate of the first fluid through the heat exchanger, and a constant flow of the mixture through the sense tube is established regardless, within wide limits, of the rate of flow of the first fluid. Moreover, the relative proportions of the first fluid drawn at the two sampling points are adjusted automatically in accordance with the rate of flow through the heat exchanger.

The main valve described above may be a spring-loaded check valve for providing a constant pressure drop across the valve for variable flow therethrough.

The third restricted orifice is preferably adjustable to control the relative proportions of fluid drawn from the two sampling points under predetermined conditions, whereby the system may be initially tuned.

BRIEF DESCRIPTION OF THE DRAWINGS

A better understanding of the invention may be gained from a consideration of the following detailed description of the preferred embodiments thereof, taken in conjunction with the appended figures of the drawing, wherein:

FIG. 1 is a diagrammatic view of a preferred embodiment of apparatus constructed in accordance with the invention;

FIGS. 2 and 3 are fragmentary diagrammatic views of two different modifications of a portion of the apparatus of FIG. 1.

DESCRIPTION OF THE PREFERRED EMBODIMENTS

Figure 5:
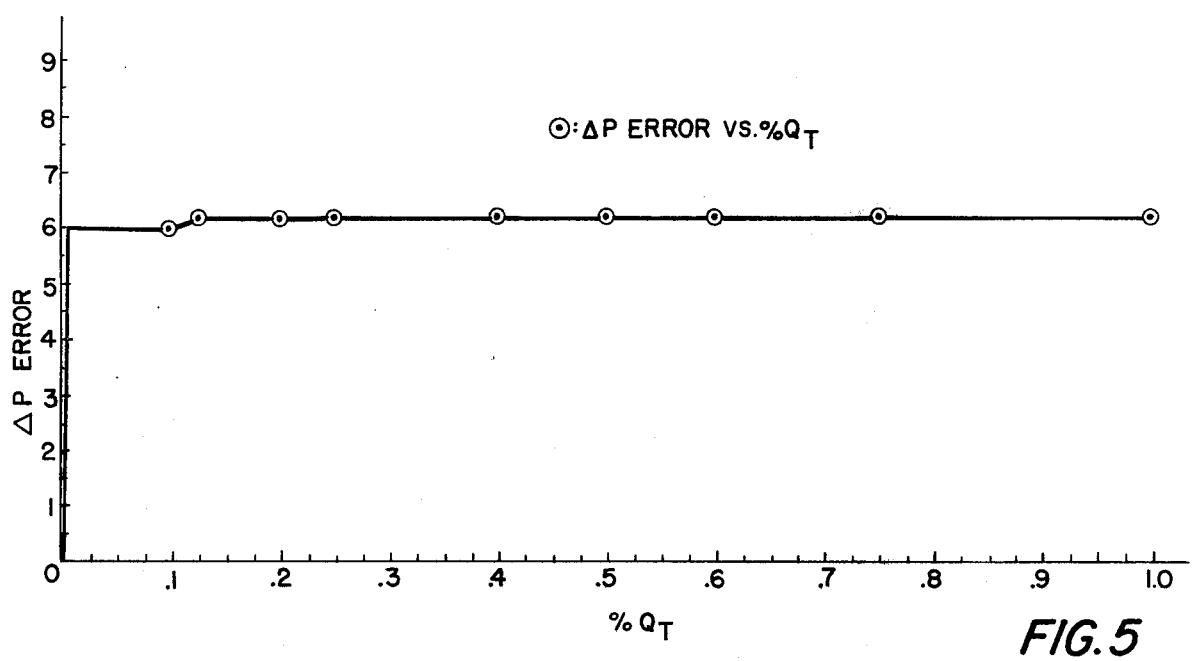
FIGS. 4-6 are graphs showing various relationships characteristic of the system.

FIG. 1 shows a system 10 constructed in accordance with the invention. The system supplies a fluid such as hot water at a variable flow rate, depending on the demands made by associated hot-water faucets, showers, washing machines for clothes and dishes, etc. (not shown), and at a substantially constant, controlled temperature. In the usual application, where hot water is the fluid being supplied on demand, the controlled temperature will have a set point, maintained by a thermostatic control (not shown), which may be in the vicinity of, say, 180° F.

The system 10 comprises a heat exchanger 12 formed with inlet means indicated generally at 14 and outlet means indicated generally at 16 whereby a fluid such as water can be supplied to and withdrawn from the heat exchanger 12 in accordance with demand.

Means 17 is also provided for passing a second fluid through the heat exchanger 12. The second fluid may typically be hot water or steam. The second fluid is physically isolated from, but in heat-exchange relation to, the first fluid. The two fluids are respectively at temperatures such that heat is transferred between them and a temperature gradient is established in the first fluid in the direction of its flow. Ordinarily, the first fluid at the inlet 14 is at a temperature which may be in the neighborhood of 50° F. The temperature rises to a value which, as indicated above, may be about 180° F. in the vicinity of the outlet 16. The second fluid as supplied to the heat exchanger 12 may be at a temperature which is close to or above the boiling point of water.

The temperatures mentioned above are only by way of example; the invention is in fact applicable to the case where the second fluid cools the first, and in that case a refrigerant such as Freon ® or another fluorinated hydrocarbon can be passed through the coil 20 of the heat exchanger 12. In the preferred embodiment of the invention, however where hot water or steam is fed through the coil 20, the temperature gradient established in the water in the storage tank 22 of the heat exchanger 12 rises from a low value at and in the vicinity of the inlet 14 to a high value at and in the vicinity of the outlet 16. That is, a temperature gradient is established generally in the direction of flow of water through the storage tank 22 between the inlet 14 and outlet 16.

In accordance with the invention, means including a sense tube 24 is provided for forming a substantially homogeneous mixture of different portions of the water drawn from sampling points 26 and 28 spaced apart along the temperature gradient mentioned above.

The apparatus of the invention employs three restricted orifices, identified as R1, R2, and R3, respectively, and a constant ΔP check valve 30 biased toward the closed position by a spring 32 in the outlet 16 to insure that the relative proportions of the water sampled at points 26 and 28 and mixed in the sense tube 24 depend on the flow rate of the water through the heat exchanger 12. Specifically, the exchanger outlet means 16 comprises the main valve 30, which is adjustabe in accordance with demand by the spring 32, and the restricted orifice R1, which is fixed. The main valve 30 and restricted orifice R1 are hydraulically in parallel relation to each other, since the restricted orifice R1 is in an extension of the sense tube 24 which bypasses the valve 30 and empties into the outlet 16.

The construction of the valve combination 30, 32 is such that the pressure drop across the valve 30 is substantially constant regardless, within wide limits, of the demand for water. Such valves are conventional and well known to those skilled in the art.

The sense tube 24 is connected to the sampling point 28 by an opening in the sense tube 24 at the point 28 and to the sampling point 26 by a shunt extension 34 of the sense tube 24.

The sense tube 24 is thus connected on the one hand to the sampling points 26 and 28 and on the other hand to the restricted orifice R1 in such a manner that the portions of the water taken at the sampling points flow serially through the sense tube as a substantially homogeneous mixture and through the restricted orifice R1.

The shunting means formed by the line 34 extends between the sampling points 26 and 28. The flow of water through the apparatus 12 is thus divided into a main flow path (through the storage tank 22 proper) accommodating most of the flow and a shunt flow path (through the line 34) accommodating some of the flow. A second fixed restricted orifice R2 is provided in the main flow path and hydraulically between the sampling points 26 and 28. A third restricted orifice R3 is formed in the line 34 and hydraulically in series with the sense tube 24 and the sampling point 26. By this means, a pressure difference is established between the sampling points 26 and 28 depending on the flow rate of the water through the heat exchanger 12. The third restricted orifice R3 is adjustable to control the relative proportions of water drawn from the sampling points 26 and 28 under predetermined conditions, whereby the system may be initially tuned.

Because of the substantially constant pressure drop across the valve 30, and further in view of the constant resistance presented by the restricted orifice R1, a constant flow of the mixture in the sense tube 24 is established, regardless, within wide limits, of the rate of flow of water through the heat exchanger.

The heat exchange coil 20 extends to a source 36 of heat. The source 36 may be of any suitable design and may comprise, for example, a flow regulator 38, a heat exchange coil 40, and a burner 42. The flow regulator 38 may be a pump in the case where the fluid to be circulated through the heat exchange coils 20 and 40 is water and a steam valve in the case where the fluid is steam.

The control signal $T_s$ is developed by a temperature sensor 43 and supplied on a line 44 to regulate the supply of heat delivered to the coil 20 from the source 36, as shown in FIG. 1. As FIG. 2 shows, the signal $T_s$ on the line 44 may regulate the flow regulator 38, while, as FIG. 3 shows, it may alternatively regulate the burner 42. In either case, the rate at which heat is transferred from the coil 20 to the water in the storage tank 22 is controlled.

In the following analysis, the symbols used have the meanings indicated in Table I.

TABLE I

| SYMBOL | MEANING |
|---|---|
| TM | Temperature of fluid mixture in the sense tube 24 |
| QH1 | Flow rate of heated water entering sense tube 24 |
| TH | Temperature of heated water entering sense tube 24 |
| QC1 | Flow rate of cold water entering sense tube 24 |
| TC | Temperature of cold water at entrance 14 |
| QM | Flow rate of water in sense tube 24 |
| K | A constant |
| q | QC1 (TH-TC) (expressed in BTU per hour) |
| ΔP | Pressure drop across valve 30 |
| TO | Temperature at the outlet 16. |

With reference to Table I and FIG. 1, the temperature of the fluid in the sense tube 24 is $$TM = \frac{(QH1)(TH) + (QC1)(TC)}{QH1 + QC1} \quad (1)$$

For the condition of constant flow in the sense tube 24,
$$QM = QH1 + QC1 = K. \quad (2)$$

Therefore
$$TM = TH - (QC1/QM)(TH - TC) \quad (3)$$

for TH and QM constant, $TM = TH - q/QM$, where q is an instantaneous measure of the rate of heat transfer required by the heater, expressed in BTUs per hour.

Figure 4:
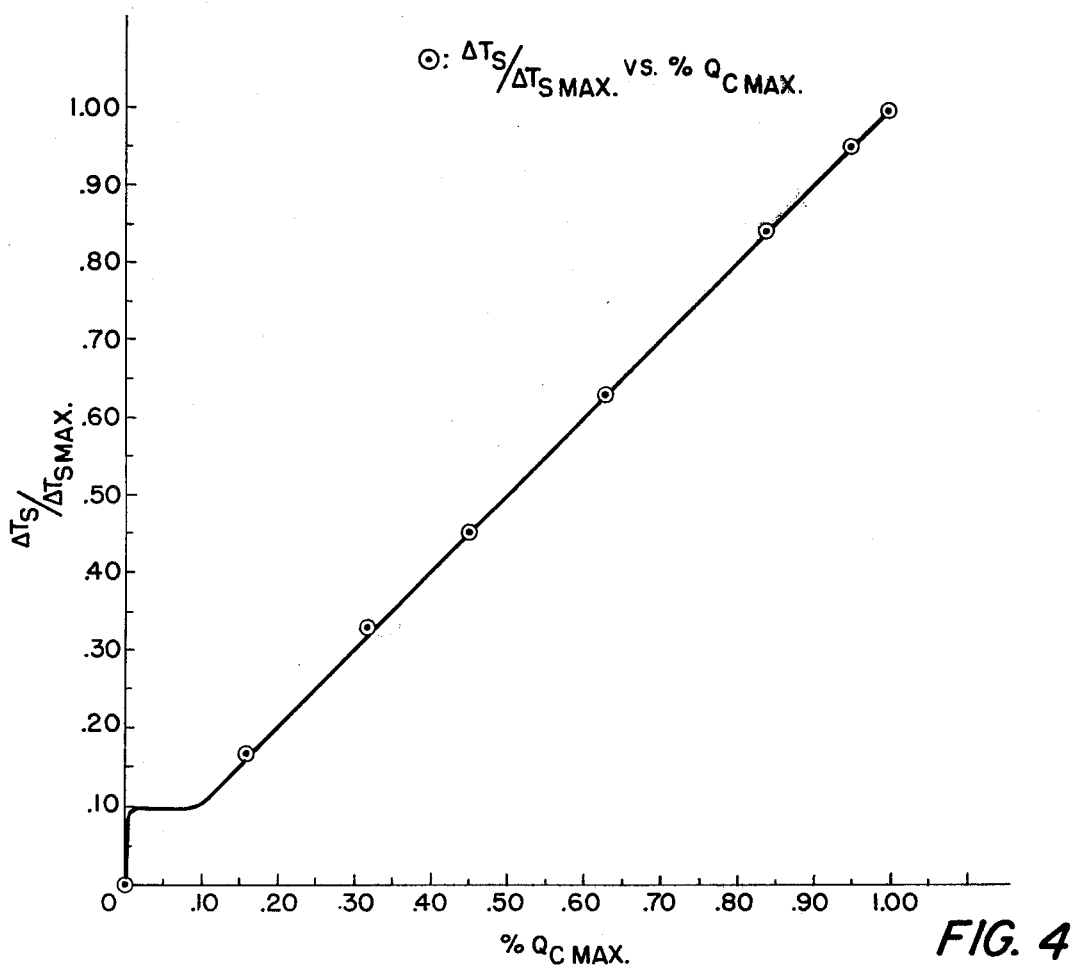

Thus TM is a linear function of the heat transfer requirements. See FIG. 4, which shows that when QC is, say, 45% or 85% of its maximum value, then the change in TS is likewise 45% or 85%, respectively, of its maximum possible value.

To achieve QM = K, the check valve 30, 32 (FIG. 1) produces a constant ΔP over a specified range of velocities (flow). See FIG. 5, which shows that, for flow rates above about 10% or 11% of the maximum, the pressure drop across the valve is constant at about 6. The ordinate units are arbitrary, since the actual pressure depends on the design of the valve.

The flow QM at temperature TM is combined with the outlet flow QT to produce a final outlet temperature TO. The error in outlet temperature (TH−TO) can be shown to be
$$(TH - TO) = QC1(TH - TC)/(QT + QM). \quad (4)$$

Figure 6:
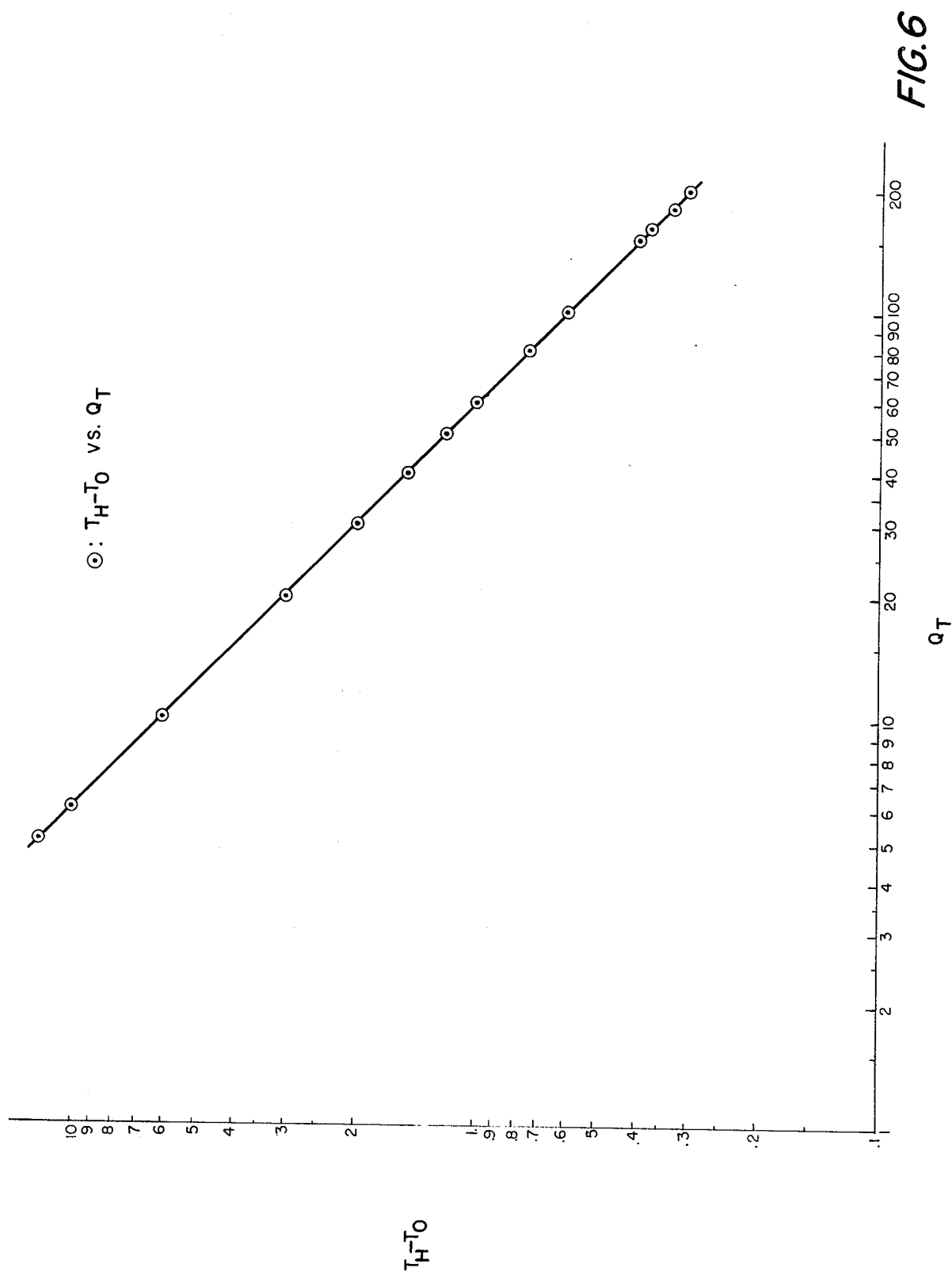

Since, as equation (2) shows, QM = K, and since both QT and QC1 are functions of the same flow (across R2), the outlet temperature error (equation (4)) is a constant for all flow greater than 0. Moreover, for a given TM, the absolute error is an inverse function of design flow through the heat exchanger 12 (see FIG. 6, which is plotted on a logarithmic scale).

Thus there is provided in accordance with the invention a novel and highly-effective system wherein a combined set point and feed forward control is established that minimizes fluctuations in the temperature of the hot water by anticipating changes in BTU requirements. The system including the feed forward control operates automatically in response to the inherent pressure of the water as delivered by the mains, and no pump is required for this purpose, thus ensuring extraordinary reliability.

Many modifications of the representative embodiments of the invention disclosed above will readily occur to those skilled in the art upon consideration of this disclosure. The invention is accordingly not limited to the specific embodiments thereof disclosed herein but includes all structure which is within the scope of the following claims, and equivalents thereof.

I claim:

1. A system for supplying a first fluid on demand and at a substantially constant, controlled temperature, comprising:
    a heat exchanger having an inlet and outlet between which the first fluid passes, said heat exchanger also having a means for passing a second fluid in heat exchange relation to the first fluid without being in direct physical contact therewith, the fluids being at different temperatures and so placed that a temperature gradient is established in the first fluid in the direction of its flow;
    a sense tube means connected to receive at least two different portions of the first fluid drawn from at least two respective sampling points spaced along the temperature gradient and to form a substantially homogeneous mixture thereof;
    a constant pressure device arranged so as to form a constant pressure differential across the sense tube such that a constant flow is established through the sense tube;
    a flow restricting means for assuring that the flow of the first fluid through the heat exchanger creates a pressure differential between the sampling points that depends on the rate of flow of the first fluid in such a way that the relative ratio of the portions of first fluid from the different sampling points in the sense tube, depends generally linearly on the flow rate of the first fluid;
    means for sensing the temperature of the mixture; and
    control means responsive to the sensed temperature for controlling the rate of heat transfer between the first and second fluids.

2. A system according to claim 1 wherein said control means comprises means for controlling the temperature of the second fluid as supplied to the heat exchanger.

3. A system according to claim 1 wherein said control means comprises means for controlling the rate at which the second fluid is supplied to the heat exchanger.

4. A system according to claim 1 wherein said first fluid is water and the temperature of the second fluid exceeds that of the water as supplied to the heat exchanger, whereby the water is heated.

5. A system for supplying a fluid at a variable flow rate, depending on demand, and at a substantially constant, controlled temperature, comprising:
    a heat exchanger formed with inlet and outlet means for a fluid that can be supplied to and withdrawn from the heat exchanger in accordance with demand, said heat exchanger including a main valve which is adjustable in accordance with demand and a first restricted orifice, said main valve and restricted orifice being hydraulically in parallel relation to each other;

means for passing a second fluid through the heat exchanger, the second fluid being physically isolated from, but in heat exchange relation to, the first fluid, the fluids being respectively at temperatures such that heat is transferred between them and a temperature gradient is established in the first fluid in the direction of its flow;

mixing means for forming a substantially homogeneous mixture of different portions of the first fluid drawn from sampling points spaced along said temperature gradient, said mixing means including a sense tube hydraulically connected, on the one hand, to a shunting means extending between said sampling points and, on the other hand, to said restricted orifice, in such a manner that the portions of the first fluid taken at the sampling points flow serially through the sense tube as a substantially homogeneous mixture and through said restricted orifice, said shunting means dividing the flow of said first fluid through the heat exchanger into a main flow path accommodating most of the flow and a shunt flow path accommodating some of the flow, a second restricted orifice being located in the main flow path hydraulically between the sampling points and a third restricted orifice being located in the shunt path hydraulically in series with the sense tube and one of the sampling points, such that the portions of the first fluid are in relative proportions depending on the flow rate of said first fluid through the heat exchanger, and a constant flow of said mixture through the sense tube is established regardless, within wide limits, of the rate of flow of said first fluid;

means for sensing the temperature of the mixture in said sense tube; and control means responsive to the sensed temperature for controlling the rate of heat transfer between the first and second fluids, whereby a combined set point and feed forward control is established to minimize fluctuations in the temperature of the first fluid, as withdrawn from the heat exchanger, by anticipating changes in heat-transfer requirements.

6. A system according to claim 5 wherein the main valve is a spring-loaded check valve for providing a constant pressure drop across the valve for variable flow therethrough.

7. A system according to claim 5 wherein the third restricted orifice is adjustable to control the relative proportions of fluid drawn from the two sampling points under predetermined conditions, whereby the system may be initially tuned.

* * * * *